May 2, 1939. E. POMMER 2,157,013
BOTTLE SEALING APPARATUS
Filed March 5, 1937 5 Sheets-Sheet 1

INVENTOR
ERWIN POMMER
BY
Richards & Geier
ATTORNEYS

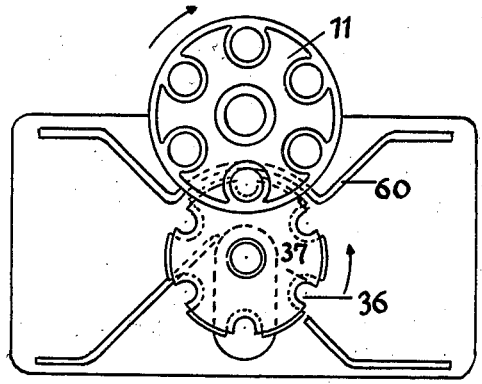
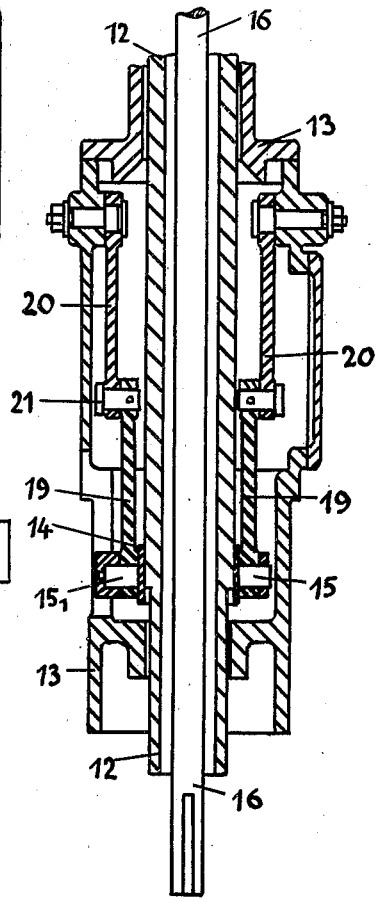
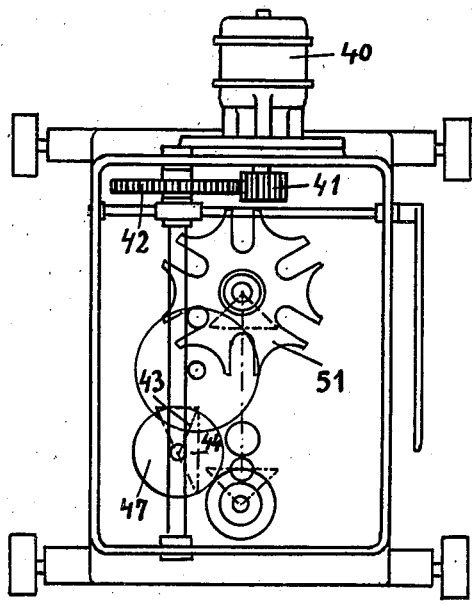

May 2, 1939.　　　　　E. POMMER　　　　　2,157,013
BOTTLE SEALING APPARATUS
Filed March 5, 1937　　　5 Sheets-Sheet 4
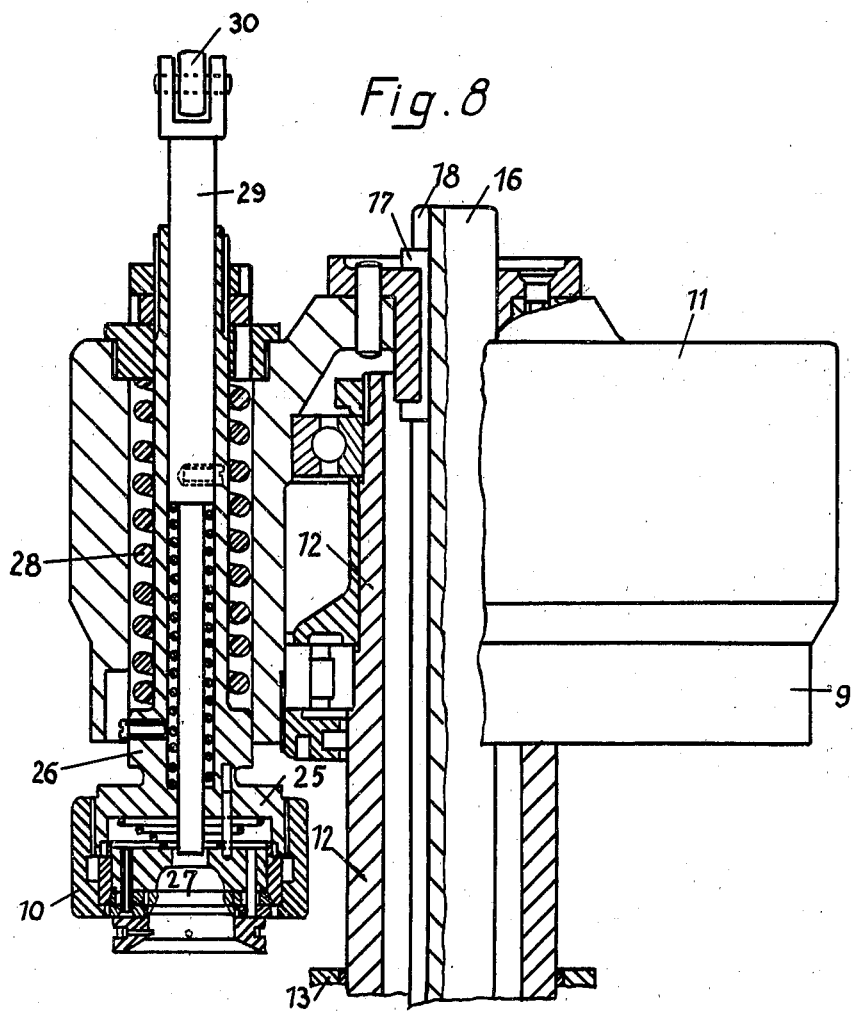
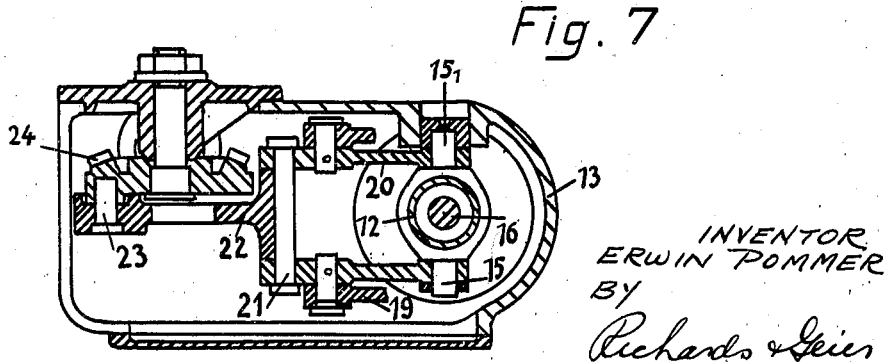
INVENTOR
ERWIN POMMER
BY
Richards & Geier
ATTORNEYS May 2, 1939.  E. POMMER  2,157,013
BOTTLE SEALING APPARATUS
Filed March 5, 1937  5 Sheets-Sheet 5
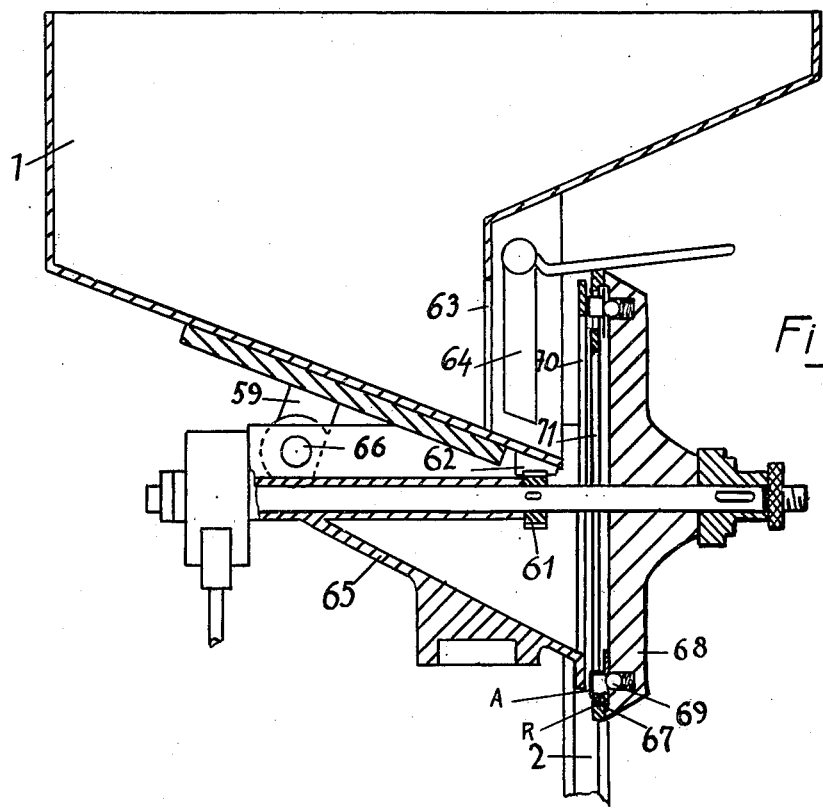
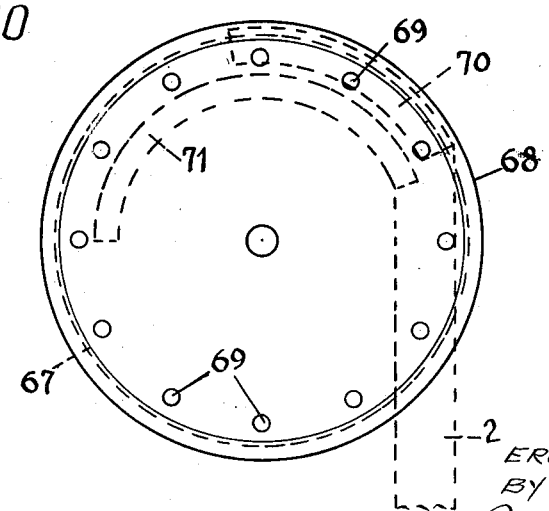
INVENTOR
ERWIN POMMER
BY
Richards & Geier
ATTORNEYS Patented May 2, 1939

2,157,013

UNITED STATES PATENT OFFICE 2,157,013

BOTTLE SEALING APPARATUS

Erwin Pommer, Vienna, Austria

Application March 5, 1937, Serial No. 129,161
In Austria March 7, 1936

12 Claims. (Cl. 226—84)

This invention relates to a machine for automatically feeding caps, especially tear-off caps for the closure of bottles, from a charging hopper to the closing mechanism, and for tightly sealing the bottles with the said caps, and consists in the provision of means for guiding the caps gliding downwards from the charging hopper to a positioning disc and then into a downwardly guiding channel or chute.

At the mouth of the guiding channel or chute there is provided a feed device which receives one cap at a time from the chute and brings the same into position axially beneath the hollow of a closing or sealing head. According to the invention a plurality of sealing heads are disposed upon a vertically reciprocating and periodically revoluble revolving head which operates the feed device and which effects, in continuous succession, the sealing of the bottles which are automatically and at the same time brought up into position by a rotary disc.

Within one cycle of operation of the revolving head with its closure or sealing heads the cap brought centrally into position beneath one of the sealing heads by the feed device is first lifted by the sealing head and received in the hollow thereof, after which the feed device is returned to its original position, while the sealing head which previously took up a cap, and beneath which a bottle has in the meantime been brought into position, seals this bottle with the cap.

The movements of the revolving head are brought about on the one hand by an arrangement of toggle levers which is operated from the driving motor of the machine through the intermediary of gearing, and which imparts a vertically reciprocating movement, and on the other hand by a maltese-cross drive which is suitably coupled to the said gearing, and which imparts the periodical rotary movement to the revolving head and to the bottle conveying disc.

In order to prevent a cap which for any reason, such as breakage of a bottle, failure on the part of the machine to bring a bottle into position beneath a loaded sealing head, or the like, does not become used, from remaining in the sealing head there is provided in the hollow stem by which the sealing head is secured on the revolving head a spring-stressed ejector pin which is depressed by a non-yielding stop during the rotation of the revolving head, and which dislodges any such cap from the sealing head.

A form of construction of machine in accordance with the invention is shown, by way of example, in the accompanying drawings forming part of the present specification, and in which:

Fig. 4 is a diagrammatic plan view of the revolving head and of the bottle conveying disc together with the work table.

Fig. 5 shows the pedestal casing with the driving means.

Fig. 6 shows the arrangement of the pair of toggle levers with the parts shown in longitudinal section.

Fig. 7 shows the same in horizontal section.

Fig. 8 shows the revolving head with a sealing head, in vertical middle section.

Fig. 9 shows the charging and straightening device for the caps, in vertical section.

Fig. 10 shows a part of the latter device in elevation.

The machine according to the invention consists of the following main parts, corresponding to the individual working phases: (1) The charging device for the caps, (2) The feed device for the caps, (3) The revolving head carrying six sealing heads, (4) The device for receiving the caps and for sealing the bottles therewith, (5) The means for periodically rotating and vertically reciprocating the revolving head, and (6) The bottle conveying or feed disc and the parts of its drive.

Figure 1:
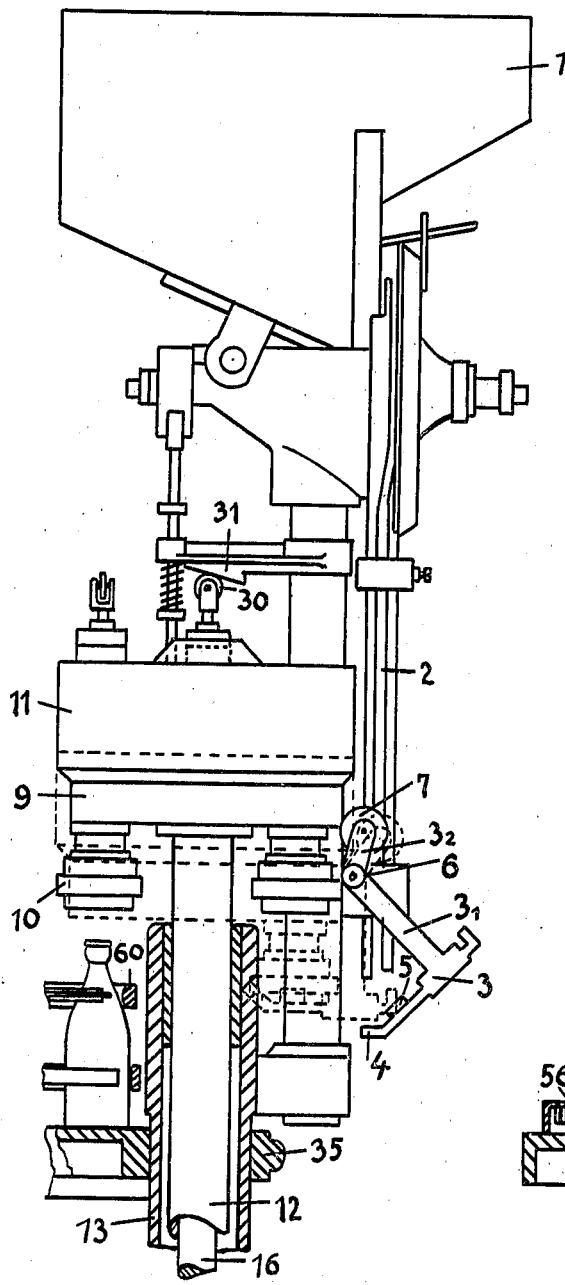
Fig. 1 shows the upper part and Fig. 1a the lower part of the machine in vertical section, and partly in elevation.
Figure 2:
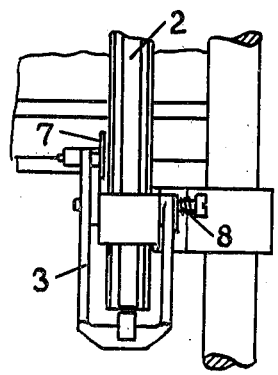
Fig. 2 shows a detail of the feed lever arrangement.

The charging and conveying device for the caps (Fig. 1) comprises a hopper 1 from which the caps, after having been brought into the proper position by suitable means to be described in due course, pass one by one into the chute 2 at the orifice of which they are held by a stirrup-shaped feed lever 3 the web of which is widened towards the front and provided with a bent tongue 4 and with a small pedestal or stud 5 for engagement by a cap as it drops out. The limb $3_1$ of the stirrup is bent at an angle and pivoted at the apex 6 of this angle, and is provided at the end of the shorter arm $3_2$ with a sliding roller 7 which is pressed by a spring 8 (Fig. 2) against the shouldered envelope 9 of a revolving head 11 constituting the carrier for six sealing heads 10 distributed uniformly about its axis. This envelope 9 is reduced in diameter towards its lower end and holds the feed lever with the lower surface in its initial position.

The revolving head 11 (Figs. 1 and 8) is rotatably mounted on a hollow shaft 12 which is itself slidably mounted in a casing 13 (Fig. 1a) and is provided at its lower part with a collar 14 which prevents the hollow shaft 12 from rotating, by means of pins 15, 15₁ (Fig. 6) provided on either side, and of which the pin 15₁ extends into the casing wall. In addition, the revolving head 11 is so secured, by means of key 17 and key-way 18, to a rotary shaft 16 disposed within the hollow shaft 12, that it is rotatable with this shaft and slidable thereon.

On the two pins 15, 15₁ on the collar 14 there are pivoted by one end each of the arms 19 (Figs. 1a and 8) of a pair of toggle levers the other arm 20 of which is articulated to the casing 13. To the point of connection 21 between the two arms there is articulately connected a link 22 which is articulated to a crank pin 23 (Figs. 1a and 7) pertaining to a bevel gear wheel 24.

The revolving head 11 carries, uniformly distributed in a circle about its axis, six sealing heads 10 each of which is mounted in a socket in the revolving head by means of a stem 26 attached to the top 25 of the sealing head, so as to be non-rotatable but slidable to a limited extent, and is stressed by a helical spring 28. Within the hollow stem 26 there is provided a slidable and spring-stressed ejector pin 29 which extends out beyond the stem 26 with its upper end and there provided with a slide roller 30, while the lower end passes through the top 25 of the sealing head and is capable of penetrating through a hole in the sealing head plates into the hollow space 27 in the sealing head destined for the reception of the cap. (Fig. 8). On a level with the slide roller a member having a sloping surface 31 (Fig. 1) is attached to an arm, on which the slide roller can travel at each movement.

Figure 3:
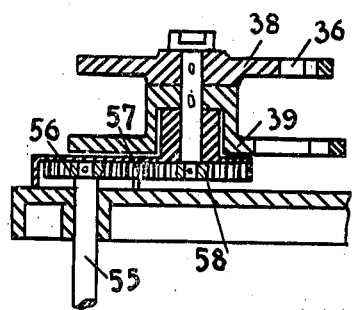
Fig. 3 shows the driving mechanism for the bottle conveying disc.

Finally, centrally beneath a sealing head 10 on the revolving head 11 there is provided the bottle table 35 which is adjustable by means of a hand-wheel 32 (Fig. 1a) and bevel gears 33, 34, and above which there rotate two feed discs 38, 39 adapted to hold the bottle at its neck and at its body in round apertures 36, 37 (Figs. 1a, 3, and 4) the spacing of which corresponds to the spacing of the sealing heads in the revolving head (Fig. 4).

Figure 1A:
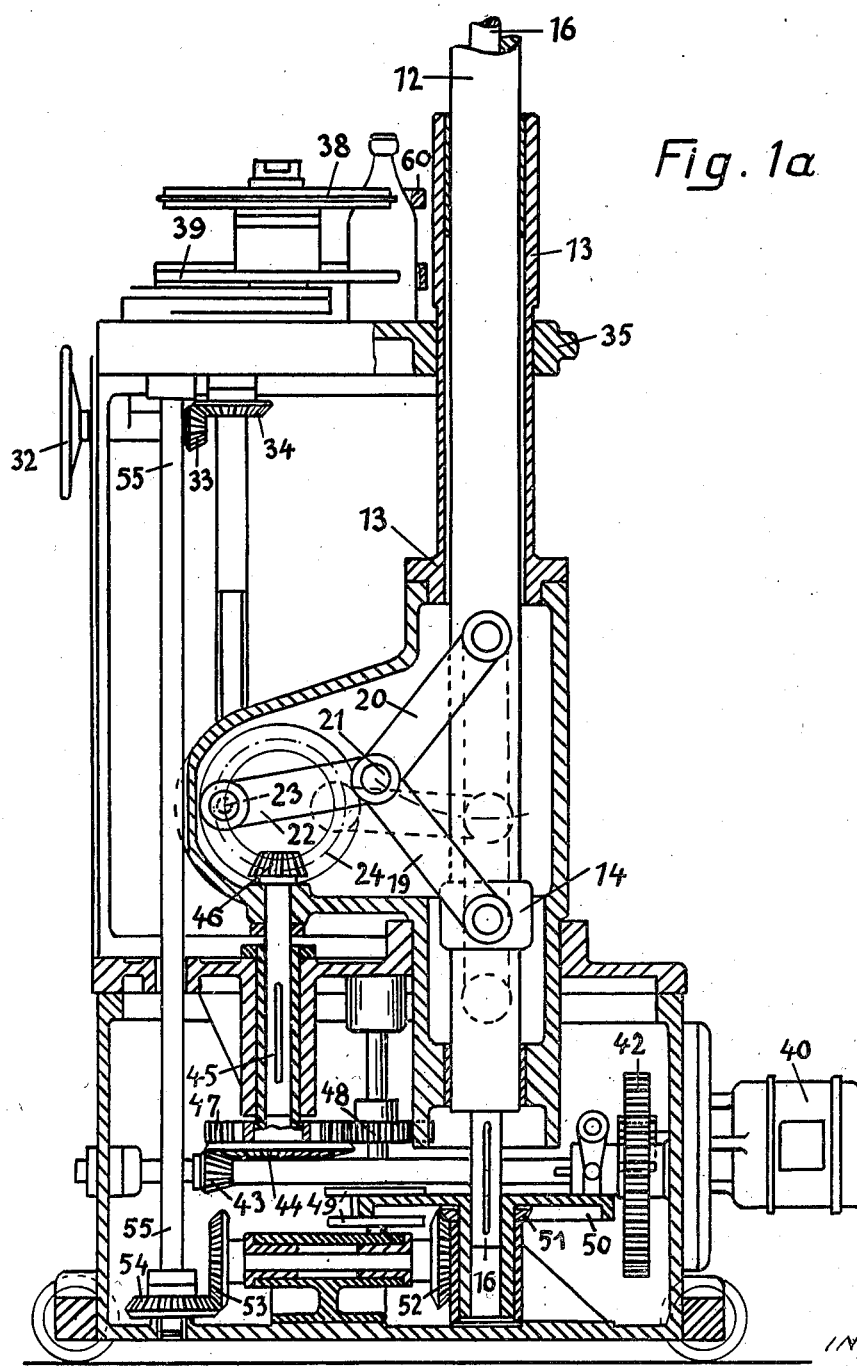

The machine is driven from a motor 40 (Figs. 1a and 5). From the shaft of this motor the drive is transmitted, by means of spur wheel 41 to a disengageable spur wheel 42 and thence, by means of a bevel gear wheel 43 keyed to the same shaft, through the bevel gear wheel 44 and bevel wheel 46 mounted on the same shaft, to the crank bevel gear wheel 24 which operates the pair of toggle levers (Fig. 1a).

On the shaft 45, which may if desired be formed integrally with the bevel gear wheel 44, there is secured a gear wheel 47 which, through the intermediary of the gear wheel 48, transmits the rotary movement to the roller discs 49 which, after each sixth of a revolution, rotate a Maltese cross 50 keyed to the inner shaft 16 of the revolving head 11. From this Maltese cross the movement is transmitted, through the train of gearing consisting of the bevel gear wheel 51, pair of bevel gears 52, 53, bevel gear 54, and shaft 55 to the spur wheel 56 (Figs. 1a and 3) which in its turn imparts a periodical rotary movement to the bottle conveying discs 38, 39 through the intermediary of a reversing gear wheel 57 and gear wheel 58.

The mode of operation of the device is as follows: The motor 40 is started up, and the hopper 1 charged to any desired extent with caps; this hopper is adapted to be easily rockable by means of a lug 59 (Fig. 9) at the bottom in a joint 66, and is shaken by means of a ratchet wheel 61 which is in constant engagement with a lug 62 on its lower edge.

In the space within the hopper, behind its outlet aperture 63 there is disposed a two-armed pivoted rake 64 (Fig. 9) having an outer arm which engages the circumferential surface of the disc 68 and which is actuated by a finger projecting from that surface, so that the rake 64 lets the tear-off caps thrown into the hopper pass by only when it is in its lowermost position in only one layer, whereas it throws the same back when it is in any other position. Beneath the charging hopper 1 there is disposed an assorting hopper 65 along the bottom of which the caps A (Fig. 9) slide one after the other, the edges R of the cap fitting into a groove 67 provided in a flange carried by a positioning disc 68. Balls 69 are inset in the said disc 68 beneath the edge of the same in such a manner that these balls partly project over the inner face of the disc, and are stressed by springs so that they will take along with them or reject the incoming caps according to the position of the latter with regard to the balls. Between the opposite faces of the assorting hopper 65 and of the positioning disc 68 there are provided two immovable segment-shaped plates 70 and 71 (Fig. 9 and 10). Near the outer edge of these plates 70 and 71 there is disposed the groove 67 in the inner surface of the flange on the positioning disc 68, the said groove 67 being such that, like the segment-shaped plates, it reaches up to the mouth of the channel of the guiding chute 2. As they come down to the positioning disc 68, the caps are gripped by the projecting balls 69 and carried along with their open end fitting over one of the balls 69, to slide into the groove 67 with the portion of their rim opposite the tear-off lip or tongue.

In the course of the rotation of the disc 68, the caps are carried by this disc until they are inserted into the space between the two immovable segment-shaped plates 70 and 71 (Fig. 10). Then they slide within that space and fall into the chute 2, one end of which is situated adjacent the ends of the plates 70 and 71.

At the uppermost end of the positioning disc 68, that is to say above the segment-shaped plates 70, 71 there is disposed the orifice of the guide chute 2 (Fig. 9) for the caps. The outlet from the downwardly sloping chute 2 is blocked by the projection 4 on the feed stirrup 3. This stirrup-shaped feed lever is initially in the position shown (in full lines) in Fig. 1, its slide roller 7 bearing against the shouldered-in portion 9 of the envelope of the revolving head 11. In the meantime, as a consequence of starting up the motor 40, the train of gearing 41—46 which stretches the pair of toggle levers 19, 20 and thereby slides the revolving head downwards has been set in operation. The slide roller 7 consequently rides over the shoulder on to the larger diametered portion of the revolving head 11, the short arm 3₂ of the feed lever 3 is swung outwards and the longer arm 3₁, together with the cap which has fallen thereon, inwards towards the position occupied by the sealing head until it stops with the cap exactly axially beneath the sealing head 10 which has been brought into the operative position. In the meantime, in consequence of the fact that the crank pin 23 of the crank disc 24 has come into the outermost position and tripped the pair of toggle levers, the revolving head has descended to such an extent the sealing head descending with it has come into position with its socket 27 over the cap on the feed lever 3. The cap is received into this socket by means of radial pins or the like, held fast, and then lifted with the revolving head, while at the same time the crank pin on the disc again reaches a slot in the Maltese cross and rotates this cross which in its turn rotates the revolving head 11 through one-sixth of a revolution, with the result that the sealing head 10 together with the cap therein is moved into the next position. At the same time the train of gearing 51—58 coupled to the Maltese cross has rotated the bottle conveying discs 38, 39 through one-sixth of their circumference, with the result that a bottle comes into position axially beneath the new position of the sealing head. The pair of toggle levers are then again doubled up, which once more lowers the revolving head 11, and this movement effects the sealing of the bottle by the one sealing head, and the taking up of a cap by the following sealing head.

During the rotation of the revolving head 11 the roller 30 pertaining to the ejector pin 29 of that sealing head 10 which is coming into the cap-receiving position comes up against the sloping surface 31 and is depressed, with the result that it ejects any cap left in the sealing head owing to breakage of a bottle or any other cause, and puts the sealing head ready for the reception of a fresh cap.

The machine works continuously. At the moment the disc is at a standstill the bottle is pushed in from the right-hand side into any one of the free apertures by hand or mechanically, and everything else is done automatically. The removal of the sealed bottle is effected by a guard 60 (Fig. 4) connected to the table.

The feeding in and carrying on of the bottles may be effected by means of a conveyor belt which brings the bottles from the filling machine to the sealing machine.

I claim:

1. A machine for sealing bottles, comprising a hopper adapted to be filled with bottle tear-off caps, a guiding chute connected with said hopper, a feeding lever having a portion receiving a cap falling from said hopper and through said chute, a revolving head, a plurality of sealing heads carried by said revolving head, means connected with said feeding lever for swinging the same in the direction of one of said sealing heads, means connected with said revolving head for intermittently rotating the same and for interrupting this rotation, means connected with said sealing heads for receiving a cap presented by said feeding lever to one of said sealing heads, and means connected with said revolving head for actuating the same to cause another one of said sealing heads to engage a bottle fed into position underneath said revolving head and to seal said bottle.

2. A machine for sealing bottles, comprising a hopper adapted to be filled with bottle tear-off caps, a guiding chute connected with said hopper, a feeding lever having a portion receiving a cap falling from said hopper and through said chute, a revolving head, two axles situated one within the other and connected with said revolving head, a plurality of sealing heads carried by said revolving head, means connected with said feeding lever for swinging the same in the direction of one of said sealing heads, a Maltese cross drive connected with one of said axles for intermittently rotating that axle and said revolving head and for interrupting this rotation, means connected with said sealing heads for receiving a cap presented by said feeding lever to one of said sealing heads, and a toggle lever arrangement connected with the other one of said axles for axially moving that axle and said revolving head to cause another one of said sealing heads to engage a bottle fed into position underneath said revolving head and to seal said bottle.

3. A machine for sealing bottles, comprising a hopper adapted to be filled with bottle tear-off caps, a guiding chute connected with said hopper, a feeding lever having a portion receiving a cap falling from said hopper and through said chute, a revolving head, two axles situated one within the other and connected with said revolving head, a plurality of sealing heads carried by said revolving head, means connected with said feeding lever for swinging the same in the direction of one of said sealing heads, a Maltese cross drive connected to the inner one of said axles for intermittently rotating the inner axle and said revolving head and for interrupting this rotation, means connected with said sealing heads for receiving a cap presented by said feeding lever to one of said sealing heads, a pair of interconnected toggle links, one of said toggle links being connected to the outer one of said axles, whereby said outer axle is locked against rotation, a casing enclosing a portion of said outer axle, the other one of said toggle links being connected to said casing, and means connected with said toggle links for actuating the same and said revolving head to cause another one of said sealing heads to engage a bottle fed into position underneath said revolving head and to seal said bottle.

4. A machine for sealing bottles, comprising a hopper adapted to be filled with bottle tear-off caps, a guiding chute connected with said hopper, a feeding lever having a portion receiving a cap falling from said hopper and through said chute, a revolving head, two axles situated one within the other and connected with said revolving head, a plurality of sealing heads carried by said revolving head, means connected with said feeding lever for swinging the same in the direction of one of said sealing heads, a Maltese cross drive connected to the inner one of said axles for intermittently rotating the inner axle and said revolving head and for interrupting this rotation, means connected with said sealing heads for receiving a cap presented by said feeding lever to one of said sealing heads, a pair of toggle links, one of said toggle links being connected to the outer one of said axles, whereby said outer axle is locked against rotation, a casing enclosing a portion of said outer axle, the other one of said toggle links being connected to said casing, a crank disc within said casing, a link articulated to said crank disc and operatively connected with said toggle links, a gear wheel engaging said crank disc for driving the same, a telescoping shaft having one end carrying said gear wheel, another gear wheel carried by the opposite end of said telescoping shaft, and means for actuating the last-mentioned gear wheel to cause a vertical movement of said revolving head.

5. A machine for sealing bottles, comprising a hopper adapted to be filled with bottle tear-off caps, a guiding chute connected with said hopper, a feeding lever having a portion receiving a cap falling from said hopper and through said chute, a revolving head, two axles situated one within the other and connected with said revolving head, a plurality of sealing heads carried by said revolving head, means connected with said feeding lever for swinging the same in the direction of one of said sealing heads, a Maltese cross drive connected to the inner one of said axles for intermittently rotating the inner axle and said revolving head and for interrupting this rotation, a feed disc connected with said Maltese cross drive, means connected with said sealing heads for receiving a cap presented by said feeding lever to one of said sealing heads, a pair of toggle links, one of said toggle links being connected to the outer one of said axles, whereby said outer axle is locked against rotation, a casing enclosing a portion of said outer axle, the other one of said toggle links being connected to said casing, a crank disc within said casing, a link articulated to said crank disc and operatively connected with said toggle links, a gear wheel engaging said crank disc for driving the same, a gear drive connecting said gear wheel with said feed disc, a shaft having one end carrying said gear wheel, another gear wheel carried by the opposite end of said shaft, and means for actuating the last-mentioned gear wheel to cause a vertical movement of said revolving head.

6. A machine for sealing bottles, comprising a hopper adapted to be filled with bottle tear-off caps, a guiding chute connected with said hopper, a feeding lever having a portion receiving a cap falling from said hopper and through said chute, a revolving head, two axles situated one within the other and connected with said revolving head, a plurality of sealing heads carried by said revolving head, means connected with said feeding lever for swinging the same in the direction of one of said sealing heads, a Maltese cross drive connected to the inner one of said axles for intermittently rotating the inner axle and said revolving head and for interrupting this rotation, means connected with said sealing heads for receiving a cap presented by said feeding lever to one of said sealing heads, a pair of interconnected toggle links, one of said toggle links being connected to the outer one of said axles, whereby said outer axle is locked against rotation, a casing enclosing a portion of said outer axle, the other one of said toggle links being connected to said casing, a plurality of rotatable discs for bringing up bottles, a reversing wheel, means connecting said reversing wheel with said discs, a gear mechanism connecting said Maltese cross drive with said reversing wheel, and means connected with said toggle links for actuating the same and said revolving head to cause another one of said sealing heads to engage a bottle fed into position underneath said revolving head and to seal said bottle.

7. A machine for sealing bottles, comprising a hopper adapted to be filled with bottle tear-off caps, a guiding chute connected with said hopper, a feeding lever having a portion receiving a cap falling from said hopper and through said chute, a revolving head, a plurality of sealing heads carried by said revolving head, means connected with said revolving head for intermittently rotating the same and for interrupting this rotation, means connected with said sealing heads for receiving a cap presented by said feeding lever to one of said sealing heads, means connected with said revolving head for vertically reciprocating the same to cause another one of said sealing heads to engage a bottle fed into position underneath said revolving head and to seal said bottle, and means connected with said feeding lever for swinging the same toward a sealing head during the downward movement of the revolving head and for swinging the feeding lever back into its original position during the return movement of the revolving head.

8. A machine for sealing bottles, comprising a hopper adapted to be filled with bottle tear-off caps, a guiding chute connected with said hopper, a stirrup-shaped cap feeding lever having the form of a bell-crank with two arms, one of said arms receiving a cap falling from said hopper and through said chute, a revolving head, a plurality of sealing heads carried by said revolving head, a sliding roller carried by the other one of said arms, a shouldered envelope carried by said revolving head, said roller bearing against said envelope, means connected with said revolving head for intermittently rotating the same and for interrupting this rotation, means connected with said sealing heads for receiving a cap presented by said feeding lever to one of said sealing heads, and means connected with said revolving head for actuating the same to cause another one of said sealing heads to engage a bottle fed into position underneath said revolving head and to seal said bottle.

9. A machine for sealing bottles, comprising a hopper adapted to be filled with bottle tear-off caps, a guiding chute connected with said hopper, a feeding lever having a portion receiving a cap falling from said hopper and through said chute, a revolving head, a plurality of sealing heads, a plurality of hollow stems, each of said hollow stems being connected with a separate sealing head, means connecting said hollow stems with said revolving head, a plurality of ejector pins, each of said ejector pins extending through a separate hollow stem, resilient means carried by said revolving head and pressing said ejector pins upwardly, means connected with said feeding lever for swinging the same in the direction of one of said sealing heads, means connected with said revolving head for intermittently rotating the same and for interrupting this rotation, means connected with said sealing heads for receiving a cap presented by said feeding lever to one of said sealing heads, means connected with said revolving head for vertically reciprocating the same to cause another one of said sealing heads to engage a bottle fed into position underneath said revolving head and to seal said bottle, and means having an abutment surface engaging at least one of said ejector pins and depressing the same on rotation of said revolving head to eject any unused cap.

10. A machine for sealing bottles, comprising a hopper adapted to be filled with bottle tear-off caps, a guiding chute connected with said hopper, a feeding lever having a portion receiving a cap falling from said hopper and through said chute, a revolving head, a plurality of sealing heads carried by said revolving head, means connected with said feeding lever for swinging the same in the direction of one of said sealing heads, means connected with said revolving head for interrmittently rotating the same and for interrupting this rotation, means connected with said revolving head for vertically reciprocating the same to cause one of said sealing heads to engage a bottle fed into position underneath said revolving head and to seal said bottle, means carried by said sealing heads for causing a sealing head to receive and raise the cap brought into position by said feeding lever as the revolving head descends, whereupon that sealing head is raised into a lifted position along with the revolving head.

11. In a machine for sealing bottles by means of tear-off caps, a hopper adapted to be filled with tear-off caps, a movable rake within said hopper, a guide chute connected with said hopper, a revolving positioning disc, projecting balls within said disc, resilient means engaging said balls, said disc having an inwardly extending flange having a peripheral groove formed therein, a revolving head, a plurality of vertically reciprocable sealing heads carried by said revolving head, said hopper having a bottom surface inclined toward said disc, said caps after passing said rake sliding upon said bottom surface to said disc and coming into position upon said disc with their rims in said peripheral groove and their open ends over said balls, said disc raising said caps and dropping them into said chute, and a feeding device for moving one of the tear-off caps leaving said chute under one of said sealing heads.

12. In a machine for sealing bottles by means of tear-off caps, a hopper adapted to be filled with tear-off caps, a revolving positioning disc adjacent the bottom of said hopper, a movable rake between said positioning disc and the bottom of said hopper, a guide chute, a revolving head, a plurality of sealing heads carried by said revolving head, a common shaft, means connected with said common shaft and said positioning disc and engaging said hopper for rotating said positioning disc and simultaneously imparting a shaking movement to said hopper, the tear-off caps in said hopper passing said rake and being moved by said positioning disc into said chute, and a feeding device for moving one of said tear-off caps from said chute under one of said sealing heads.

ERWIN POMMER.